United States Patent
Christian et al.

(10) Patent No.: US 6,721,681 B1
(45) Date of Patent: Apr. 13, 2004

(54) CHRONOMETRIC, COMMUNICATION, IDENTIFICATION, AND TRACKING TAG

(76) Inventors: Lutrell M. Christian, Petronics, Inc., 2700 Neilson Way, Suite 627, Santa Monica, CA (US) 90405; Michael J. Kramer, 60 Borica St., San Francisco, CA (US) 99999

( * ) Notice: Subject to any disclaimer, the term of this patent is extended or adjusted under 35 U.S.C. 154(b) by 0 days.

(21) Appl. No.: 10/330,569

(22) Filed: Dec. 28, 2002

Related U.S. Application Data

(63) Continuation-in-part of application No. 09/661,491, filed on Sep. 14, 2000, now Pat. No. 6,502,060.
(60) Provisional application No. 60/153,800, filed on Sep. 14, 1999.

(51) Int. Cl.[7] .......................... G04B 19/24; G06F 15/00
(52) U.S. Cl. ................. 702/178; 250/253; 340/825.54; 342/457; 348/143; 358/64
(58) Field of Search .............................. 702/176, 178, 702/179, 187; 368/10, 11, 28, 41, 62, 63; 348/143; 340/573.3, 825.54; 342/26, 457; 358/64; 250/253; 701/207

(56) References Cited

U.S. PATENT DOCUMENTS

| | | | | |
|---|---|---|---|---|
| 4,473,841 A | * | 9/1984 | Murakoshi et al. | 358/64 |
| 5,025,150 A | * | 6/1991 | Oldham et al. | 250/253 |
| 5,623,267 A | * | 4/1997 | Wurman | 342/26 |
| 5,995,019 A | * | 11/1999 | Chieu et al. | 340/825.54 |
| 6,067,018 A | * | 5/2000 | Skelton et al. | 340/573.3 |
| 6,259,404 B1 | * | 7/2001 | Parl et al. | 342/457 |
| 6,392,692 B1 | * | 5/2002 | Monroe | 348/143 |
| 6,510,380 B1 | * | 1/2003 | Curatolo et al. | 701/207 |

OTHER PUBLICATIONS

U.S. patent application Ser. No. 09/661,491, filed Sep. 14, 2000, Pet Chronometer and Identification Tag.
U.S. patent application Ser. No. 60/153,800, filed Sep. 14, 1999, Pet Clock.

\* cited by examiner

*Primary Examiner*—John Barlow
*Assistant Examiner*—John Le
(74) *Attorney, Agent, or Firm*—Cislo & Thomas LLP

(57) ABSTRACT

A chronometric identification and location tag for an animal, such as a dog, that incorporates a variety of detection and sensing functions as well as communication capacities. Assembled in a compact form that allows ready transport on a trainable animal, such as a dog, the chronometer identification and location tag enables the location of the associated animal, as well as the transmission and reception of information and data. Specific embodiments include the use of GPS to provide location data, as well as an alternative location system using temporary or permanent antenna installations. Hazardous material, visual, and acoustic detectors and other sensors and/or generators may be used in conjunction with transmission facilities for providing data regarding the animal's environment. Information and signals may be transmitted to the central controller by a receiver and a speaker can provide for audio signaling to the animal or others close to the animal in an audible range of the speaker.

19 Claims, 1 Drawing Sheet

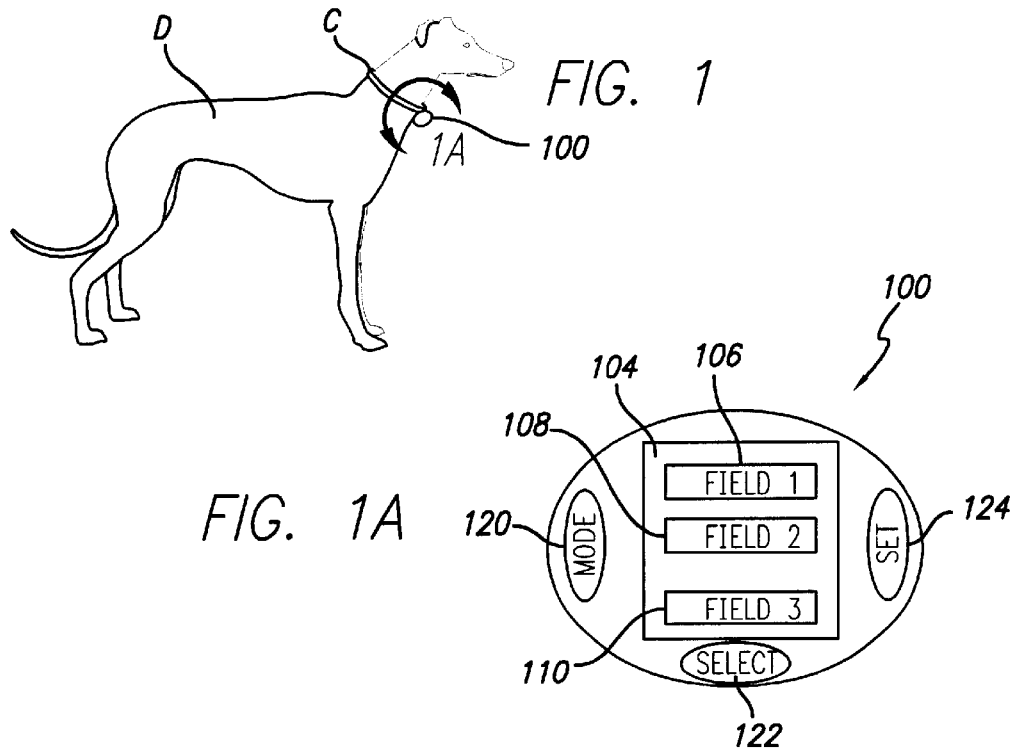
FIG. 1
FIG. 1A
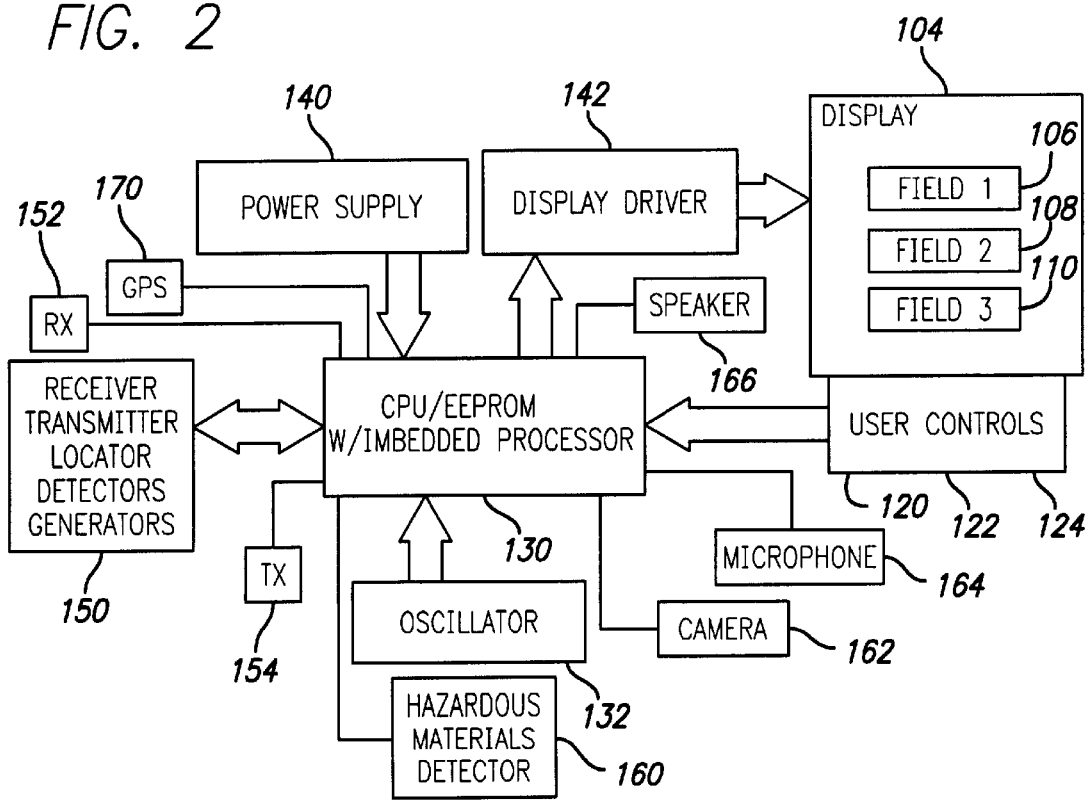
FIG. 2

CHRONOMETRIC, COMMUNICATION, IDENTIFICATION, AND TRACKING TAG

CROSS-REFERENCES TO RELATED APPLICATIONS

This patent application is a continuation-in-part of U.S. patent application Ser. Nos. 09/661,491 filed Sep. 14, 2000 entitled PET CHRONOMETER AND IDENTIFICATION TAG which issued as U.S. Pat. No. 6,502,060 on Dec. 31, 2002, which application is incorporated herein by this reference thereto.

This patent application is related to U.S. Provisional Patent Application Ser. No. 60/153,800 filed Sep. 14, 1999 for PET CLOCK, which application in its entirety is incorporated herein by this reference thereto.

BACKGROUND OF THE INVENTION

1. Field of the Invention

This invention relates to clocks and timekeeping devices, as well as electronic identification and information devices, including those used for tracking and detection, and more particularly to a portable and self-contained support system with optional features that enhance the tracking and detection of canines, other animals, or items, including humans and machinery.

2. Description of the Related Art

Domesticated animals are well known to, at times, operate in conjunction with human trainers/managers. Research is developing with respect to dolphins and their ability to help divers in open water. Animals may be used in the future to help locate land mines and the like.

Of animals currently known, dogs are particularly well developed in some areas for a cooperative man-animal relationship. Dogs are currently utilized by man to herd other animals, guide and assist the disabled, and rescue the lost or injured, among other uses. Rescue dogs have been used in the past to a significant extent with the St. Bernard having some reputation for helping those in cold climates.

With the advent of electronic information and sensor technology, there is an as-yet unrealized ability to help coordinate animal activities with those of humans. Such potential has not yet been realized, as in the past dogs have generally operated under the voice or visual (hand signal) command of a trainer who had to be physically present to direct the dog. Such situations are common with respect to drug-sniffing dogs, and other similar dogs used by police forces and the Drug Enforcement Agency (DEA).

As an extension of human activity, dogs provide a significantly adaptable resource that can be trained or taught in order to help humans pursue military, police, civilian, and/or recreational goals. Generally, with more professional dogs, the animal would be highly trained in a specific field of activity.

At this time, no significant development of the man-animal relationship via electronic information and data-gathering/sensor technology has yet been achieved. There are many advantages to be realized by such an extension as the canine's enhanced senses may lead it to better handle dangerous situations better than a human being would. Additionally, dogs are faster than human beings and are generally smaller, enabling them to travel into certain areas that would be less advantageously traveled by a human being. Also, by placing an animal in an at-risk situation, it may be possible to save human life or prevent human injury while providing advantageous benefits to certain courses of endeavor.

As yet, no longer-distance interface or interaction system is present between dogs and humans save those which have generally been known for many years.

However, with such a system, an animal, such as a dog, could provide directable or trainable means by which certain data gathering could occur in the field. The dog could act as a carrier for a data-gathering device that may interactively engage the dog and provide a variety of telemetric and environmental data.

Furthermore, while there are several commercial civilian uses of a medallion or wristwatch-type of device for pets, particularly dogs, the art would also be augmented by providing a compact miniaturized system that would allow dogs and other working animals to better communicate and indicate their whereabouts and surroundings to a human trainer or handler. The present invention provides one approach satisfying this need in the art. Additionally, location, tracking, and telemetry information of almost any article from a compact and attachable tag could provide a significant advance in the art.

SUMMARY OF THE INVENTION

In view of the foregoing disadvantages inherent in the known types of tags that provide identification and/or tracking present in the prior art, the present invention provides an identification and tracking tag, as well as a chronometer, wherein the same can be used for providing information to and from an animal with a human companion/trainer/manager. A similar tag could also be used to track and locate people and/or items. The general purpose of the present invention, which will be described subsequently in greater detail, is to provide a compact and/or miniaturized medallion type tag system that in compact form provides wireless information about the animal and/or its surroundings to a human companion and possibly delivers commands to the animal via the medallion which is not anticipated, rendered obvious, suggested, taught, or even implied by any of the prior art tag systems either alone or in any combination thereof.

While a primary embodiment of the present invention is in conjunction with animals such as dogs, the tag system set forth herein is also applicable to people, machinery, vehicles, and the like. Consequently, the use of the term "dogs" or "animal" is exemplary for all such embodiments as properly applied in the alternative environment.

In order to provide a more robust and useful identification, tracking, and location system, the present invention may use microprocessors to collect, restore, manage, display, and transceive as with a remote personal computer or personal digital assistant, PC/PDA, or other handheld device critical information of a variety of manner and sorts regarding the dog, the dog handler, and the immediate surroundings. GPS or similar tracking technology may also be used to help pinpoint the geographical location of the service dog by continual or intermittent transmission of the electronic signal to such device. In addition, detectors within the medallion/tag may be used to detect certain toxic chemicals and/or radioactive materials within the animal's immediate surroundings. Video and audio signals could also be transmitted to a remote and monitoring PC/PDA. Transmission of an electronic image of a service dog's immediate physical surroundings could be done via a head camera or other video image transmission device to a remote receiver, including a remote PC/PDA or other handheld device.

A small microphone or other audio sensor, embedded or coupled to the medallion/tag, may help transmit audio signals of ambient sound surrounding the animal in order to provide more information for the dog handler regarding the animal's environment.

Additionally, a playback unit could also provide the animal audio commands that may be transmitted by analog means as by a microphone and transmission system from the handler over to the animal so that long distance audio commands may be given. Additionally, synthesized audio commands could be activated by specific digital signaling, generally in a wireless system.

Modification of the medallion/tag system could also be used in conjunction with human activities. In one embodiment, it may be attached to the belt loop of the dog handler. Such a human-focused medallion/tag may be designed to provide additional supporting or backup information to a command post, which might be particularly helpful should the service dog or dog handler become injured and/or incapacitated. Similarly, the tag may include a "panic button" for the immediate summoning of emergency help. Embedded or integrated systems or components may be added to the medallion/tag and the tag may also be embedded or integrated into equipment or materials to provide similar monitoring reconnaissance.

By providing the telemetry available through the medallion/tag, an increased technical ability to incorporate feedback and input to service dog handlers in the field and during training helps continually improve the quality and the effectiveness of the animal-human relationship as well as providing for increased development of the medallion/tag technology set forth herein.

OBJECTS OF THE INVENTION

It is an object of the present invention to provide greater effectiveness for animals working in conjunction with human beings.

It is another object of the present invention to provide greater effectiveness for search and rescue dogs by being better able to locate such animals.

It is yet another object of the present invention to provide search and rescue dogs the ability to gather information related to their environment and transmit it back to a human handler or the like.

It is yet another object of the present invention to enhance the bond between human beings and companion animals and enable them to function better in the field.

It is yet another object of the present invention to provide a compact tag or medallion which enables a search and rescue animal to be located.

It is yet another object of the present invention to provide a compact tag or medallion that enables a search and rescue animal to signal a handler and/or transmit signals relevant to the animal's environment.

It is yet another object of the present invention to provide a compact tag or medallion that acts to sense the local environment surrounding the search and rescue animal and relay that information back to a human handler.

These and other objects and advantages of the present invention will be apparent from a review of the following specification and accompanying drawings.

BRIEF DESCRIPTION OF THE DRAWINGS

FIG. 1 is a diagrammatic display showing the chronometric, communication, identification, and tracking tag as attached to the collar of a dog.

FIG. 1A is a front plan view of one embodiment of the chronometric, communication, identification, and tracking tag as shown in FIG. 1 as indicated by Circle 1A.

FIG. 2 is a flowchart diagram showing logical flow and control of signals and power through the chronometric, communication, identification, and tracking tag of one embodiment of the chronometric, communication, identification, and tracking tag electronic circuitry.

DESCRIPTION OF THE PREFERRED EMBODIMENT(S)

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Referring to the drawings where like numerals of reference designate like elements throughout it will be noted that FIG. 1 indicates a dog D having a collar C to which the chronometric, communication, identification, and tracking tag 100 of the present invention may be attached. Note should be taken that certain wireless activities and signals may be transceived by the tag 100. Those signals may be transmitted and received through an antenna or other device embedded in the collar or otherwise located adjacent the dog D. The antenna (not shown) may be one such as that which is advantageous for the operating parameters of the tag 100 or otherwise. Note should also be taken that, while mention is made specifically herein to dogs, other search and rescue animals may put the chronometric, communication, identification, and tracking tag 100 to good use with specific adaptations possibly required for certain animals such as dolphins, ferrets, and the like.

Additionally, the tag 100 may be used for location and telemetry of people and items (such as machinery, vehicles, etc.). The description set forth herein regarding animals is extendable to these other uses with minor modifications well known to those familiar with the art.

FIG. 1A shows the tag 100 in one embodiment of a display and manual interface 102 thereof. In FIG. 1A, a visual display 104 may have several visual fields 106, 108, 110. These fields may be substituted by a liquid crystal display, plasma display, or other display, so long as the energy requirements are not too great a demand on the battery/power supply. The use of the three fields 106, 108, 110 provides some substantial means by which information can be visually elicited from the chronometric, communication, identification, and tracking tag 100.

As set forth in more detail below, the use of a visual display 104 is but one means by which information may be communicated to human beings by the tag 100. Much information may be communicated through a computer interface. Using wireless technology or through a protocol by which information can be transmitted and received from the tag 100, a computer may be attached or coupled to the tag 100 in order to place information into the tag 100 or obtain information from the tag 100.

Beyond the visual display 104, a mode button or switch 120, a select button or switch 122 and/or a set button or switch 124 may all be present in the manual interface 102 of the tag 100.

The mode button 120 may control the mode in which the tag 100 operates. Generally, a default mode provides the ongoing operation and running of the tag 100. However, certain parameters may need to be set manually under certain conditions and the mode button 120 may allow the human user to access such other modes. The select button 122 may allow the human user to select from a variety of multiple-choice fields and the like, or to access and designate certain alphanumerical entries or selections in order to enter and/or retrieve data from the tag 100. The set button 124 may allow certain choices or selections to be made by a human user when engaging or interfacing with the tag 100. Preferably, information is exchanged with the tag 100 electronically, as by computer or the like. However, the manual control buttons 120, 122, 124 provide local means by which control over the tag 100 may be achieved.

The embodiment shown in FIG. 1A is but one exemplary embodiment of the inventive tag 100 set forth herein. Other alternative embodiments may also be achieved. Additionally, while the tag 100 is shown in a compact and easily transportable form, certain features and/or functions may be advantageously extended into additional devices or systems carried by the animal or dog D. As an example, additional batteries or other power supplies might be carried in saddlebags or the like strapped to the dog D.

In addition, certain features may not necessarily be microminiaturizable at this point and not sufficiently small in order to locate them within the tag 100. Moore's Law, which generally indicates that electronic information processing capacity doubles approximately every 18 months, presently appears to be a valid assumption. Consequently, with the advent of denser processing circuitry and denser memory systems, it may be entirely possible for a terahertz processing system to incorporate a terabyte memory system all within the compact confines of a lightweight and small tag easily carried by a dog on its collar. The description set forth herein envisions both a compact system as well as one that may be extendable and coupleable to systems that require the dog to wear saddlebags or the like in order to achieve the ends of the present invention.

FIG. 2 is a schematic diagram of the present invention. The visual display 104 shown in FIG. 2 may be a miniaturized full screen display or one having a number of fields such as the three fields 106, 108, 110 shown in FIG. 2. Preferably, a computer coupled to the tag 100 (as by wireless connection) provides visual access to pertinent tag data and operation.

The user controls such as the mode button 120, the select button 122, and the set button 124, may be used to manually control the operation of the tag 100. Alternatively, the tag 100 may be controlled by a wireless or wired system coupled to the tag 100. The user controls 120, 122, 124 or software-driven computer commands serve to control the central controller or CPU/EEPROM with embedded processor 130. The central controller may include memory resources for data storage and retrieval as well as processing capacity for the execution of instructions, the polling of interrupts, the monitoring of sensors, and the like. The central controller 130 may be coupled to an oscillator 132 which may both provide timing signals for the central controller 130 as well as oscillations of sufficient frequency to drive a radio frequency transmitter in the 100 to 1000 megahertz range, or otherwise.

Included in the basic infrastructure for the tag 100, the power supply 140 may be based on battery, solar, or other power and supplies power to the tag 100 including the central controller 130. The central controller 130 may also drive a display driver 142, which in turn controls the visual display 104. The tag 100 may provide chronometric functions such as time of day, elapsed time for a certain event or the like. It may also provide identification information that is inputted by the user or handler in order to identify the animal. These are all covered in U.S. Pat. No. 6,502,060 which functions, operations, and features are incorporated herein by this reference thereto.

Additional advantageous operations, features, and functions are designated generally by block 150 in FIG. 2 and set forth in more detail below.

Significantly, the chronometric, identification and tracking tag 100 set forth herein is able to provide location information for the tagged animal D. In one embodiment, the central controller 130 is coupled to a GPS (Global Positioning System) receiver that receives GPS signals from the GPS satellites currently orbiting the earth. These satellites enable a receiver to determine its location by the receipt of satellite signals. The GPS sensor 152 may transmit its signals to the central controller 130, which in turn transmits the information to a wireless transmitter or the like 154. The central controller 130 may also store the information in memory with a timestamp in order to give a record log of the animal's location via the location of the tag 100. The central controller 130 may then cause the transmitted to transmit the location information determined by the GPS sensor 152.

A receiver of that information (and such information may be encrypted) would then be able to determine the location of the dog D for search and rescue purposes. Particularly, if the animal is out of the line of sight of the handler, and the handler had a wireless-signal-receiving laptop, tablet, or other computer, the appropriate software interface would then give a relative location of the dog D or an absolute location by reference to a mapping system.

As an example, in avalanche rescue, a dog or dogs each having its own tag 100 could be allowed out into the snow field where an avalanche has recently occurred. Using their keen sense of smell, the animals could then possibly locate a victim trapped under the fallen avalanche/snow. Upon determining a generally static location for the animals, the handler and any associated emergency crew could then quickly proceed to the animals' locations. By using a pack of animals and appropriate training, if there is more than one victim, the animals may disperse in order to find more than one victim simultaneously.

An alternative means for determining an animal's location may require the establishment of a series of antennas. For purposes of example, a one-foot square area with an antenna at each corner of the one-foot square is used for descriptive purposes and is referred to herein. Due to the size of the antenna array, a completely manageable desktop system may be realized. The base antenna unit may be coupled to a computer to form a link between the tag 100 and the computer. A single base unit system may be able to handle, control, and direct several tags simultaneously.

In the antenna-based location system, the base unit sends RF (radio frequency) signals, or the like, to one or more field units, such as the medallion/tag 100 set forth herein. Upon detecting the base unit signal, the tag 100 responds with an RF signal back to the base unit. The transmission and reception of such signals takes place through the appropriate antennas or narrow band receivers with the base unit sending and receiving signals through its four antennas or otherwise and the tag 100 transmitting and receiving through its antenna.

Reception of the signal from the tag 100 is made by the base unit antennas positioned at the exemplary four corners of the square foot area. The signal from the tag 100 generally arrives at each antenna at a different time, generally giving rise to a phase shift difference in the signal received by each antenna. The relative timing of the tag signals at the four receiving antennas generally indicates the direction from which the tag's signals originate.

The radial distance from each antenna may be calculated based upon the response time of the field unit/tag 100 to the signal from the base unit or transmitter. Generally, the distance from each antenna of the tag 100 is proportional to the time between base signal transmission and tag signal reception. This is the basic "down and back" time for the original signal. This time is proportional to twice the distance of the tag 100 from the relevant antenna. When this quantity is multiplied by the speed of light and divided by two, the distance is known approximately. The total travel time increased by the latency of the response time in the remote field unit/tag 100 and other equipment. By determining the differences in the response times of reception of the tag's reply signal, the location of the tag 100, and correspondingly the associated animal, can then be determined.

One advantage to using four antennas is that one of the antennas can fail and the system will still work as it is possible to triangulate the location of the tagged animal. Additionally, noise in the system is generally reduced by the use of an increased number of antennas and certain confirming checks can be made in the system if a local failure or flaw should arise.

The system set forth above generally relies upon the precision with which the phase of the received signal from the tag 100 can be detected. It is also significant to determine the available signal level and noise in the receiver at the phase detector used with the four base unit detectors. The exact moment that the tag's reply signal arrives at each antenna may require careful or sensitive instruments to determine, since a narrowly tuned or narrow band receiver (which generally has a high Q value) may have a gradual onset of energy built up at the associated resonator.

One possible remedy for any difficulty arising with the determination of the reply signal's arrival at the base unit antenna is by using an independent wideband receiver at the base. The wideband receiver can then more easily and accurately determine the phase and timing of the reply signal. Either or both the base unit and the field unit may have an independent wideband receiver. When coupled with an associated narrow band receiver, the resulting two-receiver system can then both count wave cycles in a continuous wave signal via the narrow band receiver and also detect signal pulses well through the wideband receiver.

In order to provide better distance calculations, noise is kept to a minimum and a certain energy threshold is set above which the receiver/tag 100 and/or the base unit can determine that a signal has been received.

In an alternative embodiment, the transmitting base unit may send high amplitude or other timing signals on a regular basis, such as every million cycles. This interim time between timing signals may be programmed into the receiver/tag 100 or may be determined spontaneously on an ad hoc basis by the tag 100 upon receiving a regular series of timing signals. Under some circumstances, a second wide band receiver may be needed to deliver precision timing on the reception of the timing pulse from the transmitter base unit, as indicated above in the two-receiver system.

Reception of the timing pulse triggers a counter so that the next pulse event can be anticipated. The timer may have a same million-cycle counter or may be spontaneously programmed upon detection of the regular timing signals. The transmissions from the field unit/tag 100 generally must be at different frequencies from the transmissions from the base unit. As a consequence, the cycle count for each frequency used is different in measuring the period of time passing between the timing signals.

A check on the clarity of received signals is also available as any missed counts on the receiving end will result in an offset in the reply signal. This offset can be detected and used by the base unit. Any range calculation resulting from the offset reply signal may then be adjusted if the offset is known.

Generally, the oscillators generating such signals need a high degree of stability. However, in order to decrease the effect of instabilities, the transmission frequency of a field unit/tag 100 may be tied or linked to the received frequency for the base unit. A local oscillator, such as the oscillator 132 in FIG. 2, may provide a relatively low frequency as an output signal, which is then combined with the received frequency from the base unit in order to generate the transmit frequency for the tag 100.

As a result, due to the foregoing configuration, the round-trip time of signal transmission from the base to the field unit/tag 100 and the subsequent reply from the tag 100 should only be nominally affected by the latency occurring from the tag 100 and its recognition of the timing signal. Due to the speed of light, any Doppler effect should not be significant for dogs running even at their fastest speeds.

A significant advantage of the antenna-based system is that the range of communication/detection with the field units is maximized by narrow band communications. The energy required for transmission is generally low and detectors can filter out all but the narrow window of interest in the radio frequency spectrum. This conserves energy and maximizes useful battery life. Generally, a useful geographic range of operations is on the order of one to five miles.

Additionally, the antenna-based system is self-sufficient. While GPS technology is generally advantageous in the open field, it may be limited by line of sight requirements between receiver and satellite or otherwise. The transmission frequencies used in the antenna-based system are generally below the microwave band (approximately 2 GHz) where more precise timing is possible. 500 megahertz signals are generally less precise than 2 gigahertz signals by a factor of approximately four. At such frequencies (500 MHz), the line of sight requirement generally does not apply. The balance of transmission effectiveness and timing is a significant consideration that can generally be determined without undue experimentation upon implementation of such a system.

In another embodiment, certain detectors or detecting systems of hazardous materials 160 can be incorporated into the tag 100 or accompany the animal via saddlebags and the like coupled to the tag 100. Such detectors may include chemical sniffers that are currently in development or otherwise and may provide feedback to a handler or other individual in communication with the tag 100 by wireless technology or otherwise. Radioactive materials may also be detected by the hazardous materials sensor 160 and the same information relayed to the appropriate party.

Additionally, a camera 162, a microphone 164, and a speaker 166 may also be coupled to the central controller 130 in order to provide greater operating features for the chronometric, communication, identification, and tracking tag 100. The camera 162 may be a miniaturized video capture device that may use fiber optics or the like to transmit its images to the central controller 130 and on to the transmitter 154. The camera 162 may operate in electromagnetic frequency spectrums below and/or above the normal optical range, including infrared and ultraviolet.

The microphone 164 or the like may provide information regarding the aural or acoustic environment surrounding the dog D, with the signals being transmitted to the central controller 130 and transmitted back to any base station by transmitter 154. Furthermore, a speaker 166 may provide means by which audio signals may be transmitted by the tag 100 such as wireless audio signals received by the receiver 170. Such audio signals may include audio signals to the dog D as transmitted from a handler from a base station. Such commands may include those as "come back," "keep going," and the like. For safety, a "panic button" may be included in the tag 100 to enable urgent summoning of emergency aid.

Several other applications for the chronometric, communication, identification, and tracking tag exist, including (but not limited to):

Child-care, where the technology presented herein is designed to continually provide parents and other family members with critical information about the safety and whereabouts of small children;

Senior-care, where the technology presented herein is designed to continually provide family members and other caregivers with critical information about the safety, geographic location, and unique healthcare requirements of beloved senior citizens;

The military, where the technology presented herein is adapted with warfare technology designed to continually provide U.S., Allied, and Coalition commanders with critical information about the positive identity, geographic location, weaponry/equipment, and status of individual warriors in a battlefield situation; and In corporate and heavy industry, where the technology presented herein provides "smart bar code tags" that incorporate the tag technology set forth herein to continually provide CEO's, CFO's and corporate property-tax managers with critical fixed-asset management information and the like to reduce insurance investments, minimize property taxes, and comply with applicable property records requirements.

Other similar tracking and sensing applications will be apparent to those with knowledge of the appropriate arts, especially where the present technology may be targeted toward any endeavor in which there is significant concern about knowing the exact geographic location of a person, animal, or item of high value or interest.

Additional other features and functions may be incorporated into the chronometric, communication, identification, and tracking tag 100 as set forth herein and further development continues.

While the present invention has been described with regard to particular embodiments, please recognize that additional variations of the present invention may be devised without departing from the inventive concept. In one such alternative embodiment, the chronometric identification and location tag 100 may be subject to remote programming via signals received by the receiver 170. Data can either be downloaded or uploaded to the tag 100 via the receiver 170 or via the several now known or later developed electronic transfer protocols such as USB, serial ports, firewire, and the like. Such ongoing programming may enable the dog D to respond to different sets of command instructions as implemented by the tag 100, or may allow the tag 100 to enjoy particular applications appropriate to current or anticipated circumstances.

What is claimed is:

1. A chronometric location and tracking system, comprising:
    a locator indicating a geographic location of an item coupled to said locator;
    a two-way radio system activating said locator to transmit a reply signal to determine location of said locator;
    a base unit having at least three antennas, said base unit transmitting a first signal:
        a first receiver operatively coupled to and traveling with said locator, said first receiver receiving said first signal;
        a first transmitter operatively coupled to said first receiver, said first transmitter transmitting a reply signal when activated by said first receiver;
        said base unit receiving said reply signal and determining a relative position of said locator from at least one antenna;
        said first signal containing a timing pulse;
        said receiver detecting said timing pulse and providing synchronization with said first signal; and
        said reply signal being synchronized with said first signal and transmitted at a different frequency than said first signal such that relative distance of said locator to at least one antenna may be determined.

2. A chronometric location and tracking system as set forth in claim 1, wherein said locator further comprises:
    a global positioning system (GPS) sensor; and
    a transmitter coupled to said GPS sensor and transmitting information received from said GPS sensor.

3. A chronometric location and tracking system as set forth in claim 1, further comprising:
    said base unit determining relative positioning of said locator by comparing reception times of said reply signal between two antennas.

4. A chronometric location and tracking system as set forth in claim 3, further comprising:
    said base unit determining a phase shift of said reply signal when received by said two antennas.

5. A chronometric location and tracking system as set forth in claim 1, further comprising:
    a low frequency oscillator coupled to said first transmitter;
    said first transmitter transmitting a reply signal resulting from said first signal combined with an output signal of said low frequency oscillator.

6. A chronometric location and tracking system as set forth in claim 1, further comprising:
    a hazardous materials detector coupled to said locator.

7. A chronometric location and tracking system as set forth in claim 6, wherein said hazardous materials detector detects hazardous materials selected from the group consisting of:
    toxic chemicals and radioactive materials.

8. A chronometric location and tracking system as set forth in claim 1, further comprising:
    a video signal generator coupled to said locator, said video signal generator collecting images and transmitting signals representing said images.

9. A chronometric location and tracking system as set forth in claim 8, further comprising:

said video signal generator transmitting said image signals by fiber optics.

10. A chronometric location and tracking system as set forth in claim 1, further comprising:

an audio signal generator coupled to said locator, said audio signal generator collecting acoustic wave information and transmitting signals representing said acoustic wave information.

11. A chronometric location and tracking system as set forth in claim 10, further comprising:

said audio signal generator transmitting signals representing ambient noises and sounds.

12. A chronometric location and tracking system as set forth in claim 1, further comprising:

a speaker coupled to said locator and transmitting audio signals for hearing by said locator.

13. A chronometric location and tracking system, comprising:

a locator indicating a geographic location;

a hazardous materials detector coupled to said locator, said hazardous materials detector detecting hazardous materials selected from the group consisting of toxic chemicals and radioactive materials;

a video signal generator coupled to said locator, said video signal generator collecting images and transmitting signals representing said images;

an audio signal generator coupled to said locator, said audio signal generator collecting acoustic wave information and transmitting signals representing said acoustic wave information including signals representing ambient noises and sounds; and a speaker coupled to said locator and transmitting audio signals for hearing by another;

a two-way radio system activating said locator to transmit a reply signal to determine location of said locator;

a base unit having at least three antennas, said base unit transmitting a first signal;

a first receiver operatively coupled to and traveling with said locator, said first receiver receiving said first signal;

a first transmitter operatively coupled to said first receiver, said first transmitter transmitting a reply signal when activated by said first receiver;

said base unit receiving said reply signal and determining a relative position of said locator from at least one antenna:

said first signal containing a timing pulse;

said receiver detecting said timing pulse and providing synchronization with said first signal;

said reply signal being synchronized with said first signal and transmitted at a different frequency than said first signal such that relative distance of said locator to at least one antenna may be determined;

whereby the tracking system provides information about location of said locator and its surroundings.

14. A chronometric location and tracking system as set forth in claim 13, wherein said locator further comprises:

a global positioning system (GPS) sensor;

a transmitter coupled to said GPS sensor and transmitting information received from said GPS sensor.

15. A chronometric location and tracking system as set forth in claim 13, further comprising:

said base unit determining relative positioning of said locator by comparing reception times of said reply signal between two antennas.

16. A chronometric location and tracking system as set forth in claim 15, further comprising:

said base unit determining a phase shift of said reply signal when received by said two antennas.

17. A chronometric location and tracking system as set forth in claim 13, further comprising:

a low frequency oscillator coupled to said first transmitter;

said first transmitter transmitting a reply signal resulting from said first signal combined with an output signal of said low frequency oscillator.

18. A chronometric location and tracking system as set forth in claim 13, further comprising:

data storage for storing data relevant to said locator or an item coupled thereto, said data communicable to a computer system.

19. A chronometric location and tracking system as set forth in claim 18, further comprising:

data stored by said data storage being manageable, displayed, and transmitted by a controller.

* * * * *